United States Patent
Jeon et al.

(10) Patent No.: US 10,345,512 B2
(45) Date of Patent: Jul. 9, 2019

(54) DISPLAY DEVICE

(71) Applicant: LG DISPLAY CO., LTD., Seoul (KR)

(72) Inventors: HyeonKu Jeon, Dongducheon-si (KR); JungChul Shin, Gyeongsangbuk-Do (KR)

(73) Assignee: LG DISPLAY CO., LTD., Seoul (KR)

( * ) Notice: Subject to any disclaimer, the term of this patent is extended or adjusted under 35 U.S.C. 154(b) by 205 days.

(21) Appl. No.: 15/333,982

(22) Filed: Oct. 25, 2016

(65) Prior Publication Data

US 2017/0123145 A1 May 4, 2017

(30) Foreign Application Priority Data

Oct. 30, 2015 (KR) .................. 10-2015-0152353

(51) Int. Cl.
*F21V 8/00* (2006.01)
*G02F 1/1335* (2006.01)

(52) U.S. Cl.
CPC ......... *G02B 6/0088* (2013.01); *G02B 6/0055* (2013.01); *G02B 6/0001* (2013.01); *G02B 6/005* (2013.01); *G02B 6/0051* (2013.01); *G02B 6/0053* (2013.01); *G02B 6/0081* (2013.01); *G02B 6/0086* (2013.01); *G02B 6/0093* (2013.01); *G02F 1/133608* (2013.01); *G02F 1/133609* (2013.01); *G02F 1/133611* (2013.01)

(58) Field of Classification Search
CPC ......... G02F 1/133308; G02F 1/133608; G02F 2001/133314; G02F 2001/133317; G02F 2001/13332; G02B 6/005; G02B 6/0053; G02B 6/0088
See application file for complete search history.

(56) References Cited

U.S. PATENT DOCUMENTS

| | | | | |
|---|---|---|---|---|
| 7,764,341 B2* | 7/2010 | Yu | ........................ | G02F 1/13338 349/110 |
| 8,992,064 B2* | 3/2015 | Horikawa | ............ | G02B 6/0091 349/58 |
| 9,874,677 B2* | 1/2018 | Sasaki | .................. | G02B 6/0031 |
| 2001/0028560 A1* | 10/2001 | Yachi | ..................... | G02B 6/005 362/611 |
| 2006/0260168 A1* | 11/2006 | Yang | ..................... | G06F 1/1601 40/700 |
| 2012/0063167 A1* | 3/2012 | Ozawa | ................. | G02B 6/0031 362/609 |
| 2012/0249885 A1* | 10/2012 | Hosoki | .................. | G02B 6/005 348/725 |
| 2013/0044271 A1* | 2/2013 | Momose | ........... | G02F 1/133615 349/58 |

(Continued)

*Primary Examiner* — Alexander K Garlen
*Assistant Examiner* — Colin J Cattanach
(74) *Attorney, Agent, or Firm* — Birch, Stewart, Kolasch & Birch, LLP

(57) ABSTRACT

Discussed is a display device that may include a receiving case having a bottom surface, a case sidewall, and a sheet supporting groove prepared in the case sidewall; a backlight unit including an optical sheet part with a sheet fixing portion received in the receiving case and disposed in the sheet supporting groove; a display panel disposed on the backlight unit; a guide frame for supporting rear edges of the display panel and surrounding the case sidewall; and an optical control member confronting an outer surface of the optical sheet part with the sheet fixing portion.

12 Claims, 5 Drawing Sheets

(56) References Cited

U.S. PATENT DOCUMENTS

| | | | | |
|---|---|---|---|---|
| 2014/0133174 A1* | 5/2014 | Franklin | ............... | H05K 9/0067 |
| | | | | 362/606 |
| 2014/0177268 A1* | 6/2014 | Zhou | ...................... | G02B 6/005 |
| | | | | 362/606 |
| 2015/0085222 A1* | 3/2015 | Lee | ................... | G02F 1/133615 |
| | | | | 349/65 |
| 2016/0054624 A1* | 2/2016 | Cho | ................. | G02F 1/133605 |
| | | | | 349/58 |
| 2016/0085109 A1* | 3/2016 | Baek | ................ | G02F 1/133308 |
| | | | | 362/607 |
| 2016/0282549 A1* | 9/2016 | Masuda | ............... | G02B 6/0085 |
| 2017/0038633 A1* | 2/2017 | Na | .................... | G02F 1/133512 |
| 2018/0046031 A1* | 2/2018 | Kamada | .................... | F21V 3/00 |

\* cited by examiner

DISPLAY DEVICE

CROSS REFERENCE TO RELATED APPLICATIONS

This application claims the priority benefit of the Korean Patent Application No. 10-2015-0152353 filed on Oct. 30, 2015, which is hereby incorporated by reference as if fully set forth herein.

BACKGROUND

Field of the Disclosure

Embodiments of the present invention relate to a display device, and more particularly, to a display device capable of improving a picture quality.

Discussion of the Related Art

Generally, a display device displays an image by the use of thin film transistor functioning as a switching element. The display device is widely used as display devices of notebook computer, tablet computer, smart phone, portable display device, and portable information device as well as display devices of television or monitor. The display device may not be a self light emitting display device, and in such cases, may include a backlight unit for emitting light, which is disposed under a display panel. That is, the display device displays an image by the use of light emitted from the backlight unit.

According to an arrangement structure of a light source, the backlight unit may be largely classified into a direct type and an edge type. In case of the edge type, a light source is arranged at one side of a light guiding plate. In case of the direct type, a light source is arranged below a display panel. The direct type has a limitation in slimness. Thus, in case of a display device which emphasizes brightness of a screen instead of a thin profile, the direct type is generally used. Meanwhile, the edge type, which enables lightness and slimness, is used for a display device which emphasizes a thin profile, for example, display devices for notebook personal computer and personal computer monitor.

In the edge type backlight unit, an optical sheet is provided on the light guiding plate. In order to stably fix the optical sheet to the display device with a small bezel, various methods are used.

FIG. 1 is a cross sectional view illustrating a related art display device.

Referring to FIG. 1, the related art display device may include a light guiding plate 1, a reflective sheet 2, an optical sheet part 3, a receiving case 4, and a guide frame 5.

The light guiding plate 1 guides light emitted from a light source, whereby the light is guided upwardly, and a rear surface of a display panel is irradiated with the light.

The reflective sheet 2 is disposed on a rear surface of the light guiding plate 1, wherein the reflective sheet 2 reflects the light, which advances to a lower side of the light guiding plate 1, to the inside of the light guiding plate 1, to thereby improve a light efficiency.

The optical sheet part 3 is provided on the light guiding plate 1, wherein the optical sheet part 3 diffuses and concentrates the light upwardly guided by the light guiding plate 1. The optical sheet part 3 has a partially extending portion so as to be stably fixed to the display device. In this case, the optical sheet part 3 is placed onto one end of the receiving case 4.

Thus, one end of the receiving case 4 supports the optical sheet part 3, and the other end of the receiving case 4 supports the reflective sheet 2. In this case, a height of the receiving case 4 is to be lower than the optical sheet part 3 so that the receiving case 4 is provided under the partially extending portion of the optical sheet part 3 so as to support the optical sheet part 3.

The guide frame 5 surrounds edges of the backlight unit, and supports the display panel.

As shown in FIG. 1, in case of the related art display device, the receiving case 4 is provided only under the partially extending portion of the optical sheet part 3 so as to support the optical sheet part 3. Thus, if some of the light which is emitted from the light source and incident on the light guiding plate 1 is reflected to a lateral surface, the light is not reflected on the receiving case 4, and is advanced toward the guide frame 5. Thus, the light reflected to the lateral surface is reflected on the receiving case 4, and is then not incident on the display panel, whereby the light is absorbed in the guide frame 5, or is lost. That is, a brightness in the area where the receiving case 4 is provided only under the partially extending portion of the optical sheet part 3 so as to support the optical sheet part 3 is relatively lower than a brightness in the area where one end of the receiving case 4 is higher than a horizontal position of the optical sheet part 3. Accordingly, in the related art display device, there is a visible luminance difference between the area of the display panel which is overlapped with the optical sheet part with the extending portion and the area of the display panel which is not overlapped with the optical sheet part with the extending portion, thereby lowering a picture quality of the display device.

SUMMARY

Accordingly, embodiments of the present invention are directed to a display device that substantially obviates one or more problems due to limitations and disadvantages of the related art.

An aspect of embodiments of the present invention is to provide a display device which is capable of preventing a picture quality from being lowered by preventing a visible luminance difference on a display panel.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a display device that may include a receiving case having a bottom surface, a case sidewall, and a sheet supporting groove prepared in the case sidewall; a backlight unit including an optical sheet part with a sheet fixing portion received in the receiving case and disposed in the sheet supporting groove; a display panel disposed on the backlight unit; a guide frame for supporting rear edges of the display panel and surrounding the case sidewall; and an optical control member confronting an outer surface of the optical sheet part with the sheet fixing portion.

It is to be understood that both the foregoing general description and the following detailed description of the present invention are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this application, illustrate embodiment(s) of the invention and together with the description serve to explain the principle of embodiments of the invention. In the drawings.

DETAILED DESCRIPTION OF THE INVENTION

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a display device according to the preferred embodiment of the present invention will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted or may be brief.

Figure 1:
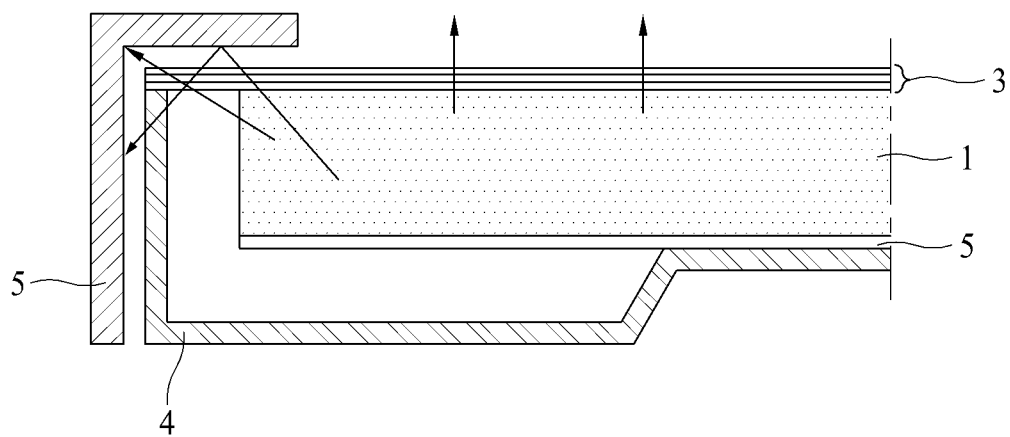
FIG. 1 is a cross sectional view illustrating a related art display device.
Figure 2:
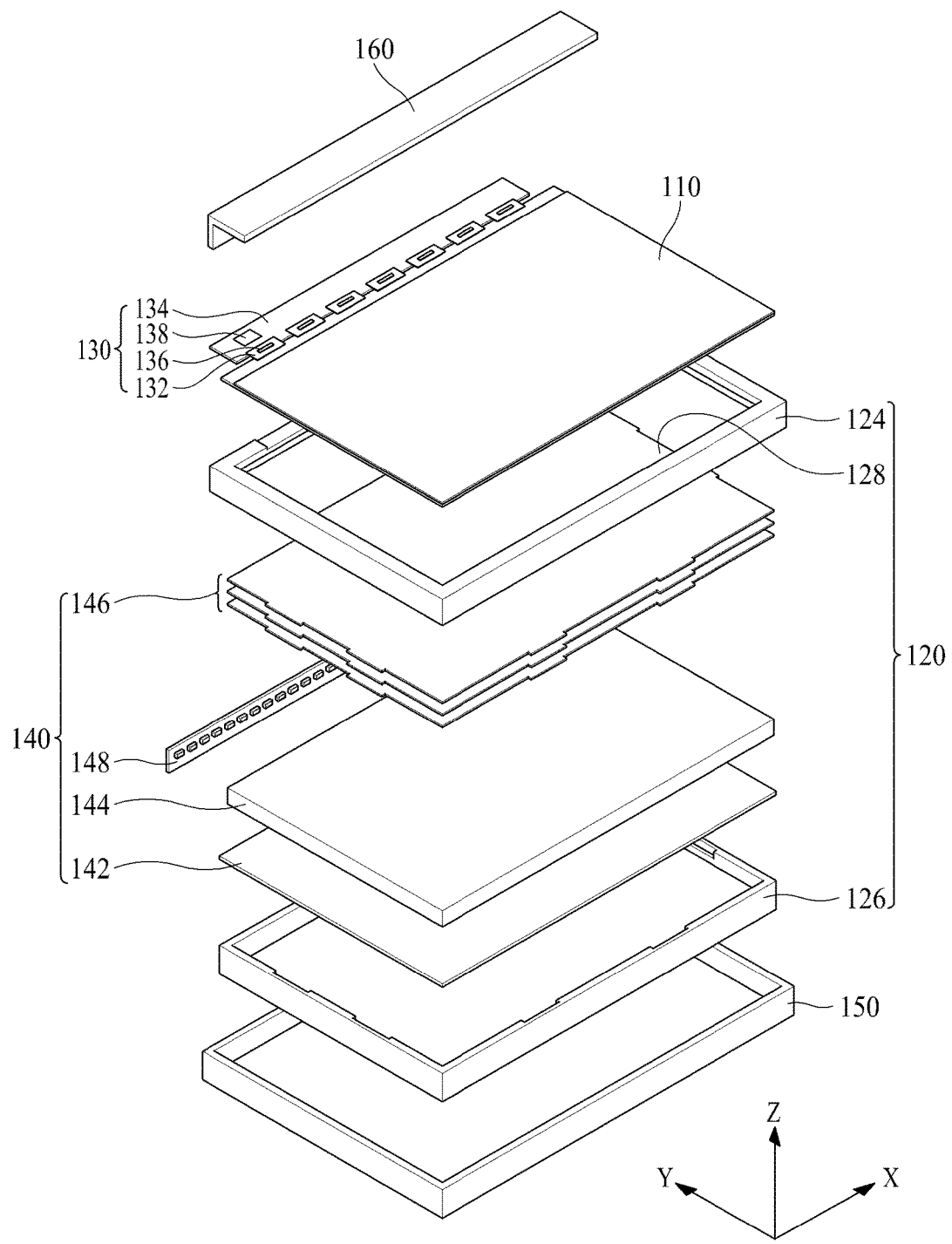
FIG. 2 is an exploded perspective view illustrating a display device according to one embodiment of the present invention.
Figure 3:
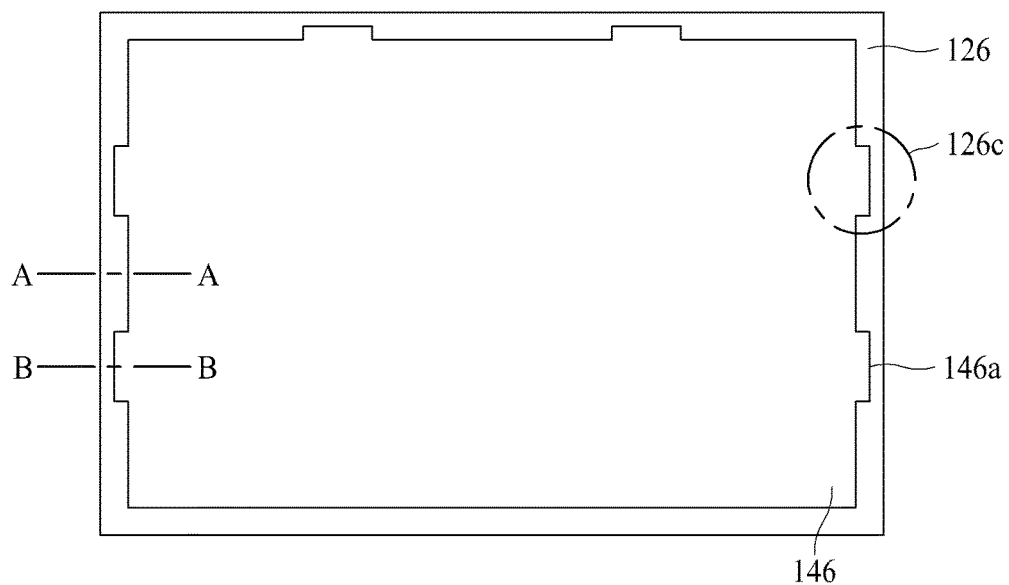
FIG. 3 is a plane view illustrating a display device according to one embodiment of the present invention.

FIG. 2 is an exploded perspective view illustrating a display device according to one embodiment of the present invention. FIG. 3 is a plane view illustrating a display device according to one embodiment of the present invention.

Referring to FIGS. 2 and 3, the display device according to one embodiment of the present invention may include a display panel 110, a panel supporter 120, a panel driver 130, a backlight unit 140, an exterior case 150, and a front part cover 160. All the components of the display device according to all embodiments of the present invention are operatively coupled and configured.

The display panel 110 is provided to display an image by controlling a light transmittance of a liquid crystal layer. The display panel 110 may include confronting lower and upper substrates bonded to each other with the liquid crystal layer interposed in-between, a lower polarizing member, and an upper polarizing member. In the display panel 110, the liquid crystal layer is driven by an electric field formed every pixel by a common voltage and a data voltage applied to each pixel, whereby a predetermined color image is displayed in accordance with the light transmittance of the liquid crystal layer.

The panel supporter 120 may include a guide frame 124, a receiving case 126, and an optical control member 128.

The guide frame 124 is disposed under the display panel 110, wherein the guide frame 124 supports the display panel 110.

The receiving case 126 receives the backlight unit 140 therein, and also supports the guide frame 124. The receiving case 126 has a sheet supporting groove 126c for supporting a sheet fixing portion 146a of an optical sheet part 146 to be explained later. In this case, the receiving case 126 with the sheet supporting groove 126c is provided to have a height which reaches a lower surface of the sheet fixing portion 146a.

The optical control member 128 confronts an outer surface of the optical sheet part 146 with the sheet fixing portion 146a. The optical control member 128 may include a light-reflecting material or light-absorbing material. The display device according to one embodiment of the present invention may include the optical control member 128 so that it is possible to prevent the difference of luminance between an area of the display panel 110 which is overlapped with the sheet supporting groove 126c and an area of the display panel 110 which is not overlapped with the sheet supporting groove 126c.

The panel driver 130, which is is connected with a pad portion prepared on a lower substrate, drives each pixel of the display panel 110, to thereby display a color image on the display panel 110. The panel driver 130 according to one embodiment of the present invention may include a plurality of circuit films 132 connected with the pad portion of the display panel 110, a plurality of data driving integrated circuits 136 mounted on the plurality of circuit films 132, a printed circuit board 134 connected with each of the plurality of circuit films 132, and a timing controller 138 mounted on the printed circuit board 134.

Each of the circuit films 132 is attached to an area between the pad portion of the lower substrate and a gate printed circuit board by a film attachment process, wherein each of the circuit films 132 may be formed of TCP (Tape Carrier Package) or COF (Chip On Flexible Board or Chip On Film). Each of the plurality of circuit films 132 is bent along one side of the display panel 110, that is, a lower side of the display panel 110, and is disposed in a rear surface of the guide frame 124.

The data driving integrated circuit 136 is mounted on each of the plurality of circuit films 132, and is connected with the pad portion through the circuit film 132. The data driving integrated circuit 136 receives a data control signal and pixel data for each pixel from the timing controller 138, converts the pixel data for each pixel into an analog-type data signal in accordance with the data control signal, and supplies the data signal to a corresponding data line.

The printed circuit board 134 is connected with the plurality of circuit films 132. The printed circuit board 134 supplies a signal for displaying an image in each pixel of the display panel 110 to the data driving integrated circuit 136 and the gate driving circuit. To this end, various signal lines, various power circuits, and a memory device are mounted on the printed circuit board 134.

The timing controller 138 is mounted on the printed circuit board 134. The timing controller 138 generates pixel data for each pixel by aligning digital video data, which is provided from an external driving system, in accordance with a pixel arrangement structure of the display panel 110 in response to a timing synchronization signal supplied from the external driving system, and provides the generated pixel data for each pixel to the data driving integrated circuit 136. Also, the timing controller 138 generates the data control signal and gate control signal on the basis of the timing synchronization signal, and controls a driving timing of each of the data driving integrated circuit 136 and the gate driving circuit in accordance with the generated data control signal and gate control signal.

Additionally, the timing controller 138 controls the backlight unit 140 by an edge type local dimming technology so that it is possible to individually control a luminance for each area of the display panel 110.

The backlight unit 140 is disposed under the display panel 110, whereby the light emitted from the backlight unit 140 is provided to a lower surface of the display panel 110. Thus, the backlight unit 140 is disposed under the display panel 110. In this case, the backlight unit 140 is received in the receiving case 126. The backlight unit 140 according to one embodiment of the present invention may include a reflective sheet 142, a light guiding plate 144, an optical sheet part 146, and a light source 148.

The reflective sheet 142 is disposed on a lower surface of the light guiding plate 144. The reflective sheet 142 reflects the light toward the light guiding plate 144, to thereby minimize a loss of light advancing to a rear surface of the light guiding plate 144.

The light guiding plate 144 is formed in a flat plate (or wedge) to have a light-incidence surface prepared on its first side. The light guiding plate 144 guides the light, which is emitted from the light source 148 and is incident on the light-incidence surface, toward the display panel 110.

The optical sheet part 146 is provided on the light guiding plate 144. The optical sheet part 146 may include a lower diffusion sheet, a prism sheet, and an upper prism sheet, but not limited to this structure. The optical sheet part 146 may be formed in a deposition structure including at least two selected among a diffusion sheet, a prism sheet, a dual brightness enhancement film, and a lenticular sheet. The optical sheet part 146 is provided with the sheet fixing portion 146a so as to be stably fixed on the light guiding plate 144. In this case, the sheet fixing portion 146a may be prepared on the remaining lateral surface except the confronting lateral surface between the light guiding plate 144 and the light source 148, wherein the sheet fixing portion 146a may protrude outwardly.

The light source 148 is provided to confront the first side of the light guiding plate 144. The light emitted from the light source 148 is incident on the light-incidence surface prepared in one surface of the light guiding plate 144. The light source 148 according to one embodiment of the present invention may include a plurality of light emitting diode packages which are mounted on an array substrate and are driven in accordance with a light source driving signal supplied from a backlight driving part so as to emit white light.

The exterior case 150 receives the receiving case 126 therein, and covers lateral surfaces of the guide frame 124, to thereby form the exterior of the display device.

The front part cover 160 for covering one edge of the display panel 110 is connected with the guide frame 124. The front part cover 160 covers the panel driver 130 connected with one edge of the display panel 110.

In the display device according to one embodiment of the present invention, the optical control member 128 is provided at one side of the guide frame 124 so that it is possible to decrease a luminance difference between an area of the display panel 110 which is overlapped with the sheet supporting groove 126c and an area of the display panel 110 which is not overlapped with the sheet supporting groove 126c, to thereby prevent a picture quality of the display device from being lowered.

Figure 4:
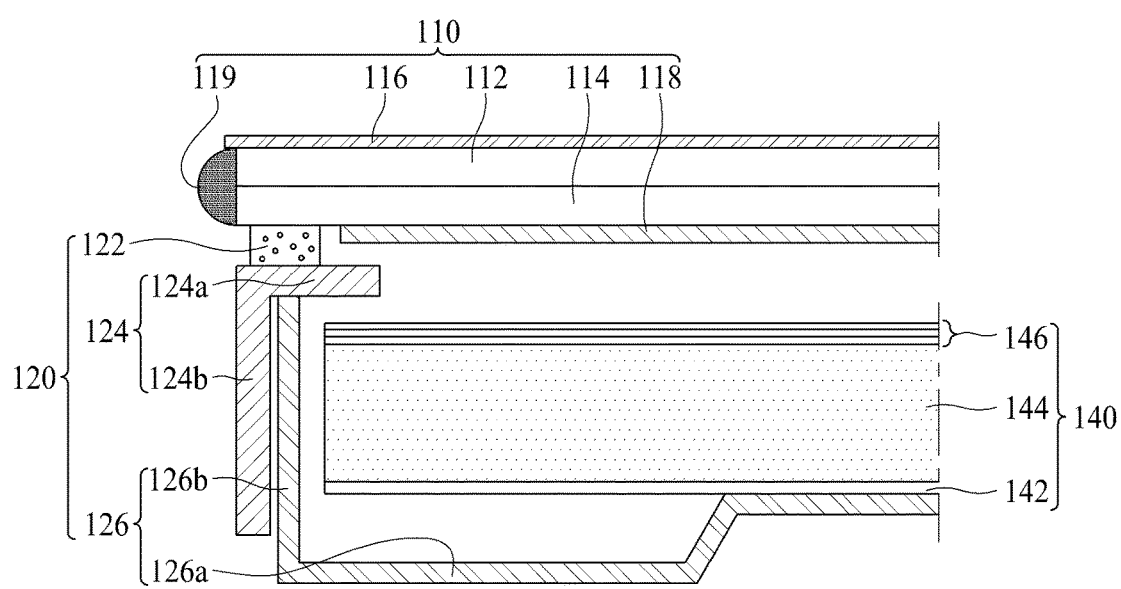
FIG. 4 is a cross sectional view along A-A line of FIG. 3, which is a cross sectional view illustrating a display device according to a first embodiment of the present invention.

FIG. 4 is a cross sectional view along A-A line of FIG. 3, which is a cross sectional view showing one side where a sheet supporting groove is not prepared in the display device according to the first embodiment of the present invention.

Referring to FIG. 4, the display device according to the first embodiment of the present invention may include a display panel 110, a panel supporter 120, and a backlight unit 140.

The display panel 110 displays a predetermined image by the use of light emitted from the backlight unit 140. The display panel 110 may include confronting upper and lower substrates 112 and 114 bonded to each other with a liquid crystal layer interposed in-between, an upper polarizing member 116 attached to the upper substrate 112, a lower polarizing member 118 attached to the lower substrate 114, and a side sealing member 119 attached to a lateral surface of the upper substrate 112.

The upper substrate 112 is a color filter array substrate, wherein an area of the upper substrate 112 is relatively smaller than an area of the lower substrate 114. The upper substrate 112 and the lower substrate 114 are bonded to each other with the liquid crystal layer interposed in-between. In this case, the upper substrate 112 may include horizontal and vertical light shielding layers for defining pixel regions corresponding to respective pixels formed on the lower substrate 114, an edge light shielding layer provided along the edge of the upper substrate 112, and a color filter provided every pixel region. The color filter filters color light with a predetermined color which is emitted from the backlight unit 140, is incident via the lower substrate 114 and is advancing toward the upper substrate 112. According to a driving mode of the liquid crystal layer, a common electrode supplied with a common voltage may be provided on the upper substrate 112.

The lower substrate 114 is a thin film transistor array substrate. The lower substrate 114 may include the plurality of pixels provided every intersection area of a plurality of gate lines and a plurality of data lines. Each pixel may include a thin film transistor connected with the gate and data lines, a pixel electrode connected with the thin film transistor, and the common electrode provided adjacent to the pixel electrode and supplied with the common voltage. According to the driving mode of the liquid crystal layer, the common electrode supplied with the common voltage may be provided on the upper substrate 112. As the light transmittance of the color light transmitting through the lower substrate 114 and the liquid crystal layer is controlled by an electric field corresponding to a differential voltage between the data voltage and the common voltage applied to each pixel on the lower substrate 114, a predetermined color image is displayed on the display panel 110.

Meanwhile, a detailed structure in each of the upper substrate 112 and the lower substrate 114 may be changed to various types generally known to those in the art in accordance with the driving mode of the liquid crystal layer, for example, TN (Twisted Nematic) mode, VA (Vertical Alignment) mode, IPS (In Plane Switching) mode, FFS (Fringe Field Switching) mode, etc.

The upper polarizing member 116 is attached to an upper surface of the upper substrate 112, wherein the upper polarizing member 116 polarizes the color light which is transmitted via the upper substrate 112, and emitted to the outside.

The lower polarizing member 118 is attached to a rear surface of the lower substrate 114. The lower polarizing member 118 is provided to the remaining portions of the lower substrate 114 except the edges of the lower substrate 114. The lower polarizing member 118 polarizes the incident light which is emitted from the backlight unit 140.

The side sealing member 119 covers lateral surfaces of the upper substrate 112 and the lower substrate 114 so as to prevent a light leakage and to protect the lateral surfaces of the upper substrate 112 and the lower substrate 114. The side sealing member 119 may be formed of thermo-curing resin or photo-curing resin.

The panel supporter 120 may include a guide frame 124 and a receiving case 126.

The guide frame 124 supports rear edges of the display panel 110, and surrounds a case sidewall 126b of the receiving case 126. The guide frame 124 is connected with the display panel 110 through the use of panel connection member 122. Preferably, the panel connection member 122 is connected with the lower substrate 114 of the display panel 110 in consideration of thickness and connection strength between the guide frame 124 and the display panel 110, but not limited to this structure. The panel connection member 122 may be connected with the lower polarizing member 118 of the display panel 110. For example, the panel connection member 122 may be double-sided tape, thermo-curing adhesive, photo-curing adhesive, or foam tape. Preferably, the panel connection member 122 may be formed of double-sided tape or foam tape with a predetermined elasticity capable of absorbing an external shock. Additionally, the panel connection member 122 may include a hollow therein. In this case, the hollow of the panel connection member 122 absorbs a pressure applied to the display panel 110, and prevents the display panel 110 from being separated from the panel connection member 122 when the display panel 110 moves.

The guide frame 124 includes a panel connection portion 124a and a guide sidewall 124b.

The panel connection portion 124a is connected with the rear edge of the display panel 110 through the use of panel connection member 122. In this case, the panel connection portion 124a is connected with the rear edge of the lower substrate 114 by the panel connection member 122, but not limited to this structure. The panel connection portion 124a may be connected with an edge of the lower polarizing film 118 attached to an entire rear surface of the lower substrate 114.

The guide sidewall 124b is vertically bent from the panel connection portion 124a. In this case, a connection hook or connection groove may be provided in the guide sidewall 124b, that is, the connection hook or connection groove may be connected with the receiving case 126.

The receiving case 126 receives the backlight unit 140 therein. The receiving case 126 may include a bottom surface 126a and the case sidewall 126b.

The bottom surface 126a supports the backlight unit 140. Herein, only the end of the bottom surface 126a may be bent so as to support the backlight unit 140.

The case sidewall 126b is vertically bent from one end of the bottom surface 126a. Herein, the sheet supporting groove 126c is not prepared in the case sidewall 126b, whereby one end of the case sidewall 126b may be higher than a horizontal position of the backlight unit 140. Thus, the case sidewall 126b reflects the light, which is reflected to a lateral surface from the backlight unit 140, toward the display panel 110. Also, the case sidewall 126b may support the panel connection portion 124a of the guide frame 124. In this case, a connection groove or connection hook may be provided in the case sidewall 126b, whereby the connection groove or connection hook of the case sidewall 126b may be connected with the guide sidewall 124b by the use of coupling member such as screw.

The backlight unit 140 is received in the panel supporter 120. The backlight unit 140 emits the light to the entire rear surface of the display panel 110. The backlight unit 140 may include a reflective sheet 142, a light guiding plate 144, and an optical sheet part 146.

The reflective sheet 142 is disposed on a rear surface of the light guiding plate 144. The reflective sheet 142 reflects the incident light, which is guided by the light guiding plate 144, toward the display panel 110.

The light guiding plate 144 is formed in a flat plate (or wedge) to have a light-incidence surface prepared on its at least one surface.

The optical sheet part 146 is provided on the light guiding plate 144. The optical sheet part 146 improves the luminance properties of light advancing from the light guiding plate 144 toward the display panel 110. The optical sheet part 146 may include at least one diffusion sheet and at least one prism sheet among a lower diffusion sheet, a lower prism sheet, an upper prism sheet, and an upper diffusion sheet.

In the display device according to the first embodiment of the present invention, in case of one side which is not provided with the sheet supporting groove, one end of the case sidewall 126b is higher than the horizontal position of the backlight unit 140 so that it is possible to reflect the light, which is reflected from the backlight unit 140 to the lateral surface, toward the display panel 110.

Figure 5:
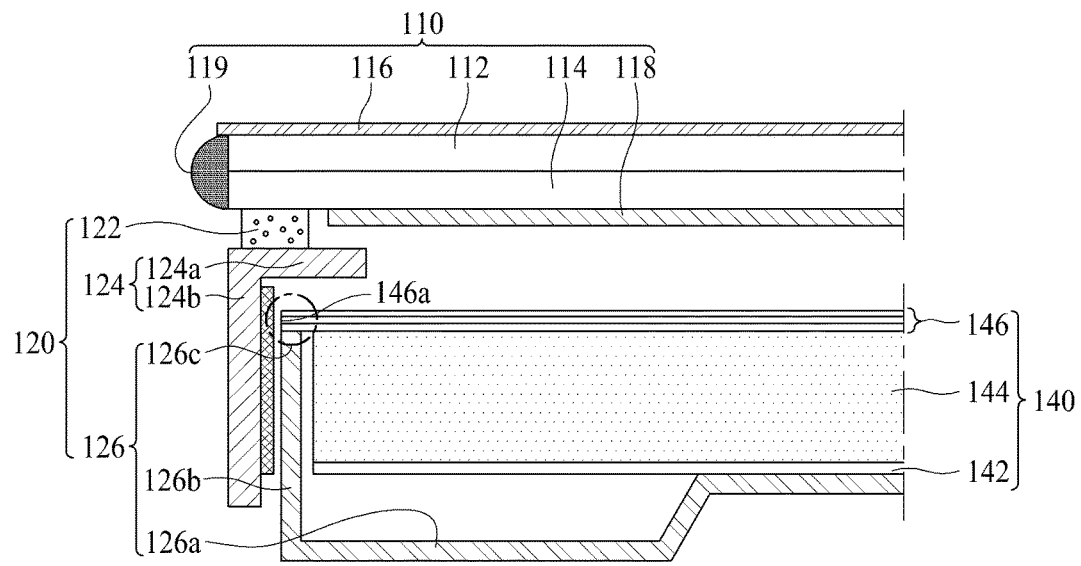
FIG. 5 is a cross sectional view along B-B line of FIG. 3, which is a cross sectional view illustrating the display device according to the first embodiment of the present invention.

FIG. 5 is a cross sectional view along B-B line of FIG. 3, which is a cross sectional view showing the other side where a sheet supporting groove is prepared in the display device according to the first embodiment of the present invention. Except for a panel supporter and an optical sheet part, it is the same as that of FIG. 4 (or some variations may apply). Hereinafter, only the panel supporter and optical sheet part will be described, and a detailed description for the same parts will be omitted or may be brief.

The panel supporter 120 may include a guide frame 124, a receiving case 126, and an optical control member 128.

The guide frame 124 supports rear edges of the display panel 110, and surrounds a case sidewall 126b of the receiving case 126. The guide frame 124 may include a panel connection portion 124a for supporting the rear edges of the display panel 110, and a guide sidewall 124b connected with the panel connection portion 124a so as to surround the case sidewall 126b.

The receiving case 126 may include a bottom surface 126a, the case sidewall 126b, and a sheet supporting groove 126c prepared in the case sidewall 126b.

The sheet supporting groove 126c is provided to support a sheet fixing portion 146a of the optical sheet part 146, and is prepared at an end of the case sidewall 126b overlapped with the sheet fixing portion 146a. In this case, the sheet supporting groove 126c is prepared in a size appropriate for receiving the sheet fixing portion 146a, and an upper end of the case sidewall 126b provided with the sheet supporting groove 126c may be the same as a horizontal height of a light guiding plate 144.

The optical control member 128 confronts an outer surface of the optical sheet part 146 provided with the sheet fixing portion 146a. In more detail, the optical control member 128 is prepared in an internal surface of the guide sidewall 124b confronting the outer surface of the sheet fixing portion 146a. The optical control member 128 may include a light-reflecting material, and a size of the optical control member 128 may be larger than a size of the sheet supporting groove 126c. In this case, the upper end of the optical control member 128 may be positioned between an upper surface of the case sidewall 126b and the panel connection portion 124a. Accordingly, the optical control member 128 may reflect all the light which is guided by the light guiding plate 144 and is then incident on the sheet supporting groove 126c. The optical control member 128 prevents the light reflected from the light guiding plate 144 to the sheet fixing portion 146a from being absorbed in or lost by the guide frame 124. Also, the optical control member 128 reflects the light guided by the light guiding plate 144 toward the display panel 110, whereby the light, which is not reflected on the receiving case 126 positioned relatively low due to the sheet supporting groove 126c, is incident on the display panel 110.

The optical sheet part 146 is received in the receiving case 126, and is disposed above the light guiding plate 144. The optical sheet part 146 has the sheet fixing portion 146a provided in the sheet supporting groove 126c of the receiving case 126. The sheet fixing portion 146a is connected with the sheet supporting groove 126c, to thereby fix the optical sheet part 146 to the receiving case 126.

According as the display device according to the first embodiment of the present invention includes the optical control member 128 prepared in the inner surface of the guide sidewall 124b, the light is incident on the display panel area overlapped with the sheet supporting groove 126c so that it is possible to decrease a luminance difference between the area which is overlapped with the sheet supporting groove 126c and the area which is not overlapped with the sheet supporting groove 126c, thereby preventing a picture quality of the display device from being lowered.

Figure 6:
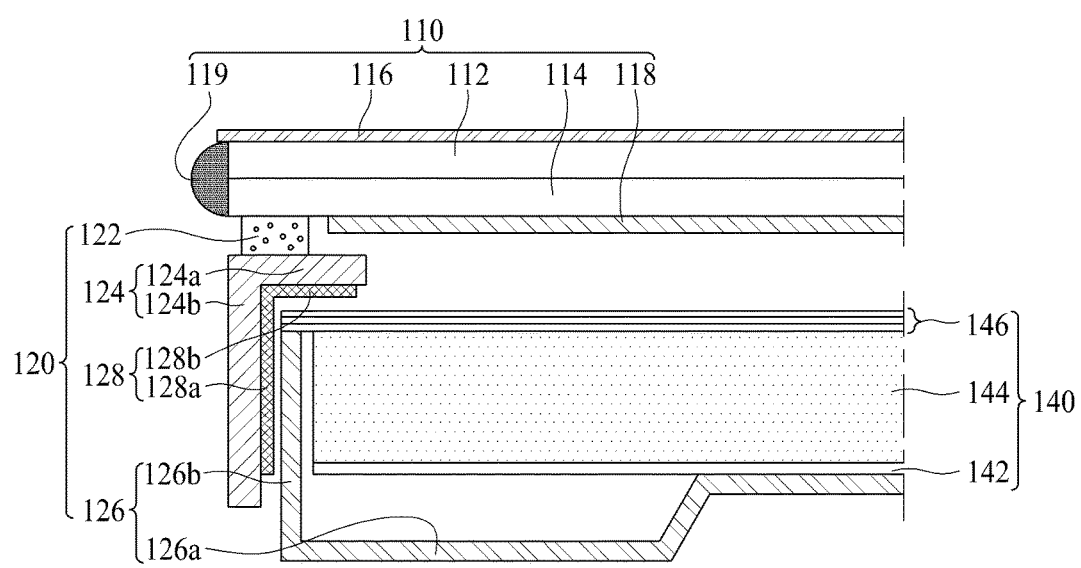
FIG. 6 is a cross sectional view along B-B line of FIG. 3, which is a cross sectional view illustrating a display device according to a second embodiment of the present invention.

FIG. 6 is a cross sectional view along B-B line of FIG. 3, which is a cross sectional view showing the other side where a sheet supporting groove is prepared in the display device according to the second embodiment of the present invention. Except for an optical control member, it is the same as that of FIG. 5 (or some variations may apply). Hereinafter, only the optical control member will be described, and a detailed description for the same parts will be omitted or may be brief.

The optical control member 128 may include a first optical control member 128a and a second optical control member 128b.

The first optical control member 128a confronts an outer surface of an optical sheet part 146 provided with a sheet fixing portion 146a. In more detail, the first optical control member 128a is prepared in an inner surface of a guide sidewall 124b confronting the outer surface of the sheet fixing portion 146a. The first optical control member 128a includes a light-reflecting material, and a size of the first optical control member 128a may be larger than a size of a sheet supporting groove 126c. Accordingly, the first optical control member 128a may reflect the light, which is reflected from a light guiding plate 144 to the sheet fixing portion 146a, toward a display panel 110. In this case, an upper end of the first optical control member 128a may be positioned between an upper surface of a case sidewall 126b and a panel connection portion 124a, and the upper end of the first optical control member 128a may be in contact with an inner sidewall of the panel connection portion 124a. Also, the first optical control member 128a may be connected with the second optical control member 128b.

The second optical control member 128b confronts an upper surface of an end of the optical sheet part 146 provided with sheet fixing portion 146a. In more detail, the second optical control member 128b is prepared in an inner surface of the panel connection portion 124a. The second optical control member 128b includes a light-reflecting material, wherein a size of the second optical control member 128b may be larger than a size of the sheet supporting groove 126c. Accordingly, the second optical control member 128b may reflect the light, which is reflected from the light guiding plate 144 to the sheet fixing portion 146a, toward the light guiding plate 144 or the display panel 110.

According as the display device according to the second embodiment of the present invention includes the optical control member 128 prepared in the inner surface of the guide sidewall 124b and the inner surface of the panel connection portion 124a, the light is incident on the display panel area overlapped with the sheet supporting groove 126c so that it is possible to decrease a luminance difference between the area which is overlapped with the sheet supporting groove 126c and the area which is not overlapped with the sheet supporting groove 126c, thereby preventing a picture quality of the display device from being lowered.

Figure 7:
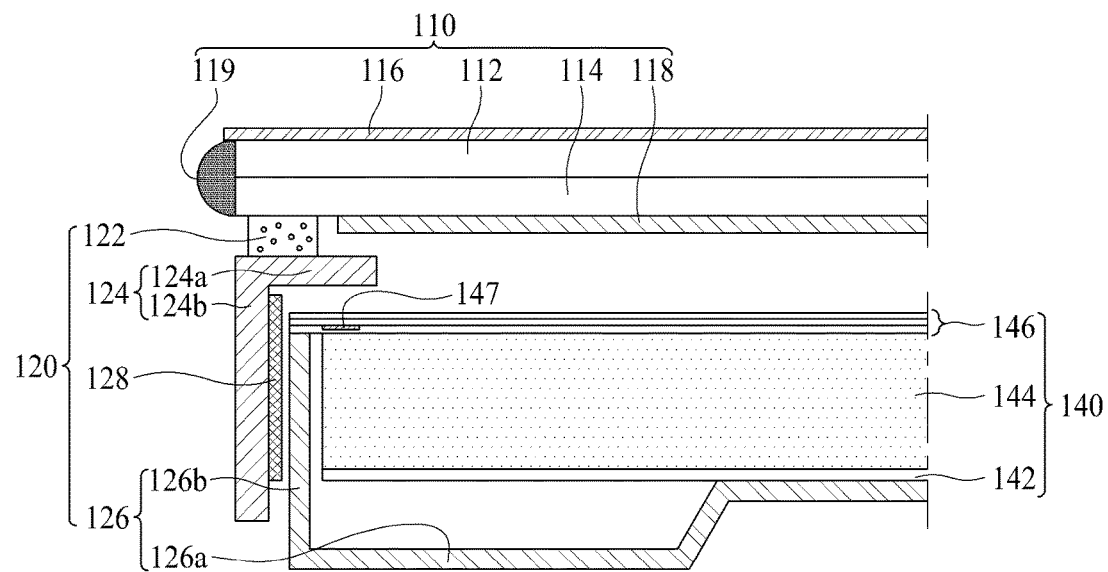
FIG. 7 is a cross sectional view along B-B line of FIG. 3, which is a cross sectional view illustrating a display device according to a third embodiment of the present invention.

FIG. 7 is a cross sectional view along B-B line of FIG. 3, which is a cross sectional view showing the other side where a sheet supporting groove is prepared in the display device according to the third embodiment of the present invention. Except for an optical sheet part, it is the same as that of FIG. 5 (or some variations may apply). Hereinafter, only the optical sheet part will be described, and a detailed description for the same parts will be omitted or may be brief.

The optical sheet part 146 is provided on a light guiding plate 144. The optical sheet part 146 improves the luminance properties of light advancing from the light guiding plate 144 toward a display panel 110. The optical sheet part 146 may include at least one diffusion sheet and at least one prism sheet among a lower diffusion sheet, a lower prism sheet, an upper prism sheet, and an upper diffusion sheet. The optical sheet part 146 may include a sheet fixing portion 146a and a light absorbing layer 147.

The sheet fixing portion 146a is disposed in a sheet supporting groove 126c of a receiving case 126, and is connected with the sheet supporting groove 126c, to thereby fix the optical sheet part 146 to the receiving case 126.

The light absorbing layer 147 may be prepared in the edge of the prism sheet. In more detail, the light absorbing layer 147 may be prepared in the diffusion sheet overlapped with the light guiding plate 144 except the sheet fixing portion 146a. In this case, the light absorbing layer 147 may be prepared in the lower diffusion sheet. The light absorbing layer 147 may be prepared in a lateral surface of the optical sheet part 146, that is, in an entire lateral surface of the optical sheet part 146 except one side provided with a light source 148 in a backlight unit 140 and the other side confronting one side. The light absorbing layer 147 may be provided in both a lateral surface of the optical sheet part 146 which is provided with the sheet fixing portion 146a and a lateral surface of the optical sheet part 146 which is not provided with the sheet fixing portion 146a, to thereby absorb the light reflected from the light guiding plate 144 toward a guide frame 124. Accordingly, the light reflected from the light guiding plate 144 to the guide frame 124 is totally decreased in the lateral surface of the backlight unit 140.

In case of the display device according to the third embodiment of the present invention, the optical control member 128 including the light-reflecting material is prepared in the inner surface of the guide sidewall 124b confronting the outer surface of the sheet fixing portion 146a.

According as the light absorbing layer 147 is prepared in the display device according to the third embodiment of the present invention, it is possible to decrease the light reflected from the light guiding plate 144 to the guide frame 124. In the display device according to the third embodiment of the present invention, the light which is incident on the lateral surface of the display panel 110 is reduced totally. Also, in case of the display device according to the third embodiment of the present invention, the optical control member 128 is prepared in the inner surface of the guide sidewall 124b confronting the sheet fixing portion 146a, whereby the light is incident on the display panel 110 overlapped with the sheet fixing portion 146a. In the display device according to the third embodiment of the present invention, the light absorbing layer 147 is prepared in the display panel area which is not overlapped with the sheet fixing portion 146a with the relatively high luminance, to thereby lower the luminance therein. Also, the optical control member 128 is prepared in the display panel area which is overlapped with the sheet fixing portion 146a so that it is possible to prevent a picture quality from being lowered by a visible luminance difference in the display panel 110.

Figure 8:
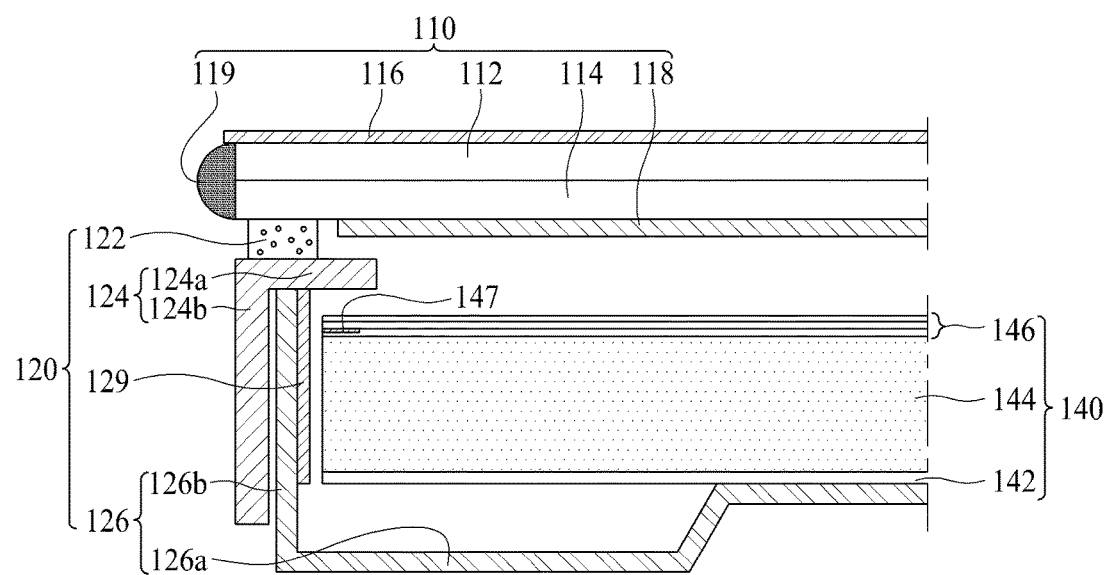
FIG. 8 is a cross sectional view along A-A line of FIG. 3, which is a cross sectional view illustrating a display device according to a fourth embodiment of the present invention.

FIG. 8 is a cross sectional view along B-B line of FIG. 3, which is a cross sectional view showing one side where a sheet supporting groove is not prepared in the display device according to the fourth embodiment of the present invention. Except for an optical control member and a light absorbing layer, it is the same as that of FIG. 4 (or some variations may apply). Hereinafter, only the optical control member and the light absorbing layer will be described, and a detailed description for the same parts will be omitted or may be brief.

The optical control member 129 confronts an outer surface of an optical sheet part 146 with a sheet fixing portion 146a. In more detail, the optical control member 129 is prepared in a case sidewall 126b so as to confront the outer surface of the optical sheet part 146 except the sheet fixing portion 146a. The optical control member 129 includes a light-absorbing material. Accordingly, the optical control member 129 may absorb the light reflected from a light guiding plate 144 to a receiving case 126, and may prevent the light reflected toward the receiving case 126 from being reflected again to a display panel 110 and being visible. In this case, an upper end of the optical control member 129 is positioned between an upper surface of the optical sheet part 146 and a panel connection portion 124a. Thus, the optical control member 129 may absorb the light reflected from the light guiding plate 144 to the case sidewall 126b of the receiving case 126.

The light absorbing layer 147 may be prepared in edges of a diffusion sheet. In more detail, the light absorbing layer 147 may be prepared in the diffusion sheet overlapped with the light guiding plate 144. For example, the light absorbing layer 147 may be prepared in a lower diffusion sheet. The light absorbing layer 147 may be prepared in a lateral surface of the optical sheet part 146, that is, in an entire lateral surface of the optical sheet part 146 except one side provided with a light source 148 in a backlight unit 140 and the other side confronting one side. The light absorbing layer 147 may be provided in both a lateral surface of the optical sheet part 146 which is provided with the sheet fixing portion 146a and a lateral surface of the optical sheet part 146 which is not provided with the sheet fixing portion 146a, to thereby absorb the light reflected from the light guiding plate 144 toward a guide frame 124. Accordingly, the light reflected from the light guiding plate 144 to the guide frame 124 is totally decreased in the lateral surface of the backlight unit 140.

According as the light absorbing layer 147 is prepared in the display device according to the fourth embodiment of the present invention, it is possible to decrease the light reflected from the light guiding plate 144 to the guide frame 124. In the display device according to the fourth embodiment of the present invention, the light which is incident on the lateral surface of the display panel 110 is reduced totally. Also, in case of the display device according to the fourth embodiment of the present invention, the optical control member 129 is prepared to confront the outer surface of the optical sheet part 146 except the sheet fixing portion 146a, whereby the light is not incident on the display panel 110 which is not overlapped with the sheet fixing portion 146a. In the display device according to the fourth embodiment of the present invention, the light absorbing layer 147 is prepared in the display panel area, to thereby lower the luminance therein. Also, the optical control member 129 for absorbing the light is prepared in the display panel area which is not overlapped with the sheet fixing portion 146a so that it is possible to prevent a picture quality from being lowered by the visible luminance difference in the display panel 110.

According to the present invention, it is possible to prevent the luminance difference between the display panel area which is overlapped with the sheet supporting groove and the display panel area which is not overlapped with the sheet supporting groove.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A display device comprising:
a receiving case having a bottom surface, a case sidewall, and a sheet supporting groove prepared in the case sidewall;

a backlight unit including an optical sheet part with a sheet fixing portion received in the receiving case and disposed in the sheet supporting groove;

a display panel disposed on the backlight unit;

a guide frame for supporting rear edges of the display panel and surrounding the case sidewall; and an optical control member confronting an outer surface of the optical sheet part with the sheet fixing portion, wherein the optical control member is interposed between the receiving case and the guide frame.

2. The display device according to claim 1, wherein the guide frame includes a panel connection portion for supporting the rear edges of the display panel, and a guide sidewall connected with the panel connection portion so as to surround the case sidewall, and the optical control member is disposed on an inner surface of the guide sidewall confronting an outer surface of the sheet fixing portion.

3. The display device according to claim 2, wherein a size of the optical control member is larger than a size of the sheet supporting groove.

4. The display device according to claim 3, wherein an upper end of the optical control member is positioned between an upper surface of the case sidewall and the panel connection portion.

5. The display device according to claim 2, wherein the optical control member is additionally disposed on an inner surface of the panel connection portion.

6. The display device according to claim 1, wherein the optical control member is disposed on the case sidewall so as to confront the outer surface of the optical sheet part except the sheet fixing portion.

7. The display device according to claim 6, wherein an upper end of the optical control member is positioned between an upper surface of the optical sheet part and the panel connection portion.

8. The display device according to claim 1, wherein the optical control member includes a light-reflecting material.

9. The display device according to claim 1, wherein the optical control member includes a light-absorbing material.

10. The display device according to claim 1, wherein the backlight unit further includes a light guiding plate received in the receiving case, and a light source for emitting light to a light-incidence part of the light guiding plate, the optical sheet part includes a diffusion sheet disposed on the light guiding plate, and the diffusion sheet includes a light absorbing layer prepared in its edge.

11. The display device according to claim 1, wherein the bottom surface and the case sidewall of the receiving case are formed as one body.

12. The display device according to claim 1, wherein a portion of the optical control member extends perpendicularly to an extending direction of the optical sheet part.

* * * * *